(12) United States Patent
Eichler

(10) Patent No.: US 9,228,623 B2
(45) Date of Patent: Jan. 5, 2016

(54) WEAR DISTANCE SENSOR FOR A BRAKE PAD OF A FRICTION BRAKE

(75) Inventor: Thomas Eichler, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 281 days.

(21) Appl. No.: 13/885,861

(22) PCT Filed: Sep. 15, 2011

(86) PCT No.: PCT/EP2011/065972
§ 371 (c)(1),
(2), (4) Date: May 16, 2013

(87) PCT Pub. No.: WO2012/035084
PCT Pub. Date: Mar. 22, 2012

(65) Prior Publication Data
US 2013/0299289 A1   Nov. 14, 2013

(30) Foreign Application Priority Data

Sep. 16, 2010   (DE) .......................... 10 2010 045 565

(51) Int. Cl.
F16D 66/02   (2006.01)
F16D 65/092   (2006.01)

(52) U.S. Cl.
CPC ............ F16D 66/021 (2013.01); F16D 65/092 (2013.01); F16D 66/027 (2013.01)

(58) Field of Classification Search
CPC ... F16D 66/021; F16D 66/024; F16D 66/026; F16D 66/025; F16D 66/00; F16D 65/092; F16D 66/027
USPC ... 188/1.11 L, 1.11 W, 1.11 E, 250 R, 250 B, 188/251 R
See application file for complete search history.

(56) References Cited

U.S. PATENT DOCUMENTS

| 3,958,445 | A | * | 5/1976 | Howard et al. ...................... 73/7 |
| 4,646,001 | A | * | 2/1987 | Baldwin et al. ............... 324/700 |
| 5,608,376 | A | * | 3/1997 | Ito et al. ........................ 340/454 |
| 5,637,794 | A | * | 6/1997 | Hanisko .......................... 73/121 |
| 6,360,850 | B1 | * | 3/2002 | Odisho et al. ............. 188/1.11 L |
| 6,366,201 | B1 | * | 4/2002 | Hanisko ........................ 340/454 |
| 6,477,893 | B1 | * | 11/2002 | Djordjevic ..................... 73/129 |

FOREIGN PATENT DOCUMENTS

| DE | 198 22 182 A1 | 11/1999 |
| DE | 10 2007 008 729 A1 | 8/2008 |
| DE | 10 2007 008 729 B4 | 11/2009 |
| EP | 0 992 702 A2 | 4/2000 |
| EP | 1 052 423 A2 | 11/2000 |

OTHER PUBLICATIONS

International Search Report dated Dec. 1, 2011 including English-language translation (Four (4) pages).
International Preliminary Report on Patentability (PCT/IB/373) and Written Opinion (PCT/ISA/237) dated Mar. 19, 2013 (Seven (7) pages).

* cited by examiner

*Primary Examiner* — Pamela Rodriguez
(74) *Attorney, Agent, or Firm* — Crowell & Moring LLP

(57) ABSTRACT

A wear distance sensor detects wear distance of a brake pad, in particular of a friction brake, and includes a housing having a friction side and a connecting side and a probe having two electrical conductor elements in combination with at least one electrical resistance element. Two dimensions of the resistance element are not constant depending on the wear distance. A third dimension of the resistance element, which has a three-dimensional design, is not constant depending on the wear distance.

22 Claims, 8 Drawing Sheets

WEAR DISTANCE SENSOR FOR A BRAKE PAD OF A FRICTION BRAKE

BACKGROUND AND SUMMARY OF THE INVENTION

The invention relates to a wear distance sensor for a brake pad of a friction brake.

Vehicles and certain technical devices, for example, hoists, frequently use friction brakes to convert kinetic energy. Disc brakes are preferred in this case, especially in passenger automobiles and in the case of commercial vehicles. In a typical construction, these disc brakes consist of a brake caliper, two brake pads, and the brake disc. Closing forces are applied and braking forces are absorbed by means of the brake caliper. The closing forces act via both brake pads on the brake disc, which experiences a deceleration of its rotational movement as a function of the level of the closing force. This deceleration is decisively also determined by the coefficient of friction between brake disc and brake pad. Since the pads are constructively designed as wear parts and the coefficients of friction are dependent on the strength, the pads are generally softer than the brake disc, i.e., the pads experience a change of the pad thickness over their usage duration, that is they wear.

The necessity results from this pad thickness change, which is caused by the wear, that it is recognized by the vehicle user when the pads have reached a so-called remaining pad thickness or wear limit and a replacement of the brake pads is necessary. In order to ensure optimum use of the brake pads, it is desirable for the instantaneous actual state of the individual brake pads, i.e., their pad thickness, to be able to be detected at any time.

Proposals for this purpose have been made, one of which provides regularly checking a marking applied to the brake pad and thus providing a decision criterion for the pad change. However, this check requires a certain regularity and certain cleaning work in order to unambiguously recognize the marking.

Another proposal provides a continuous wear display, in the case of which the wear of the brake pads of a wheel brake is indirectly measured via an electronic rotational angle measurement on a wear adjuster integrated in the wheel brake. It is disadvantageous in this case that the wear of the brake disc is also incorporated and therefore a summation wear detection of the system of brake pads/brake disc occurs.

DE 10 2007 008 729 B4 describes a sampling element for detecting a wear distance of a brake pad, in particular of a friction brake. It includes a housing having a sampling side and a terminal side; and at least one electrical conductor in combination with at least one electrical resistor element. Two dimensions of the resistor element and the electrical conductor are not constant in dependence on the wear distance. The resistor element is attached to a mount, which has a first conductor and a second conductor having a respective terminal for the electrical connection to the resistor element. The mount is designed as a wire bow, and the first and second conductors are respectively connected, at an end opposite to the terminals, to a conductor bridge.

It is therefore an object of the present invention to provide an improved wear distance sensor of a brake pad. A further object comprises providing a brake pad having such a wear distance sensor.

This and other objects are achieved by a wear distance sensor having, and a brake pad having the wear distance sensor, for detecting a wear distance of a brake pad, in particular of a friction brake. The wear distance sensor includes a housing having a friction side and a terminal side, and a probe having two electrical conductor elements in combination with at least one electrical resistor element. Two dimensions of the resistor element are not constant in dependence on the wear distance. A third dimension of the resistor element, which is implemented as three-dimensional, is not constant in dependence on the wear distance. The resistor element extends as a three-dimensional body in the direction of the wear distance with a resistor length and perpendicularly thereto with a resistor width, and the resistor element extends perpendicularly to this surface thus formed in a resistor thickness. The resistor element has a triangular shape in projection in the plane which is formed by the resistor length and the resistor width, wherein the base of this triangle extends in the direction of the resistor width and the legs of this triangle are connected in a tip which is arranged on the friction side. The first conductor element is applied in an extension in a connection section on the resistor element in the direction of one leg of the triangle in a first terminal section and is electrically conductively connected to the resistor element and extends up to the tip of the triangle. The second conductor element is electrically conductively connected at an edge to the resistor element with a connecting end opposite to the first conductor element in a second terminal section.

A basic concept of the invention comprises providing a wear distance sensor having a three-dimensional electrical resistor element having a spatial formation, of which three dimensions are changeable in dependence on the wear distance of a brake pad.

It is thus advantageously achieved that a resistance of the resistor element is changed in dependence on the wear distance, wherein this resistance forms a measure of the wear distance.

Further advantages of the invention are as follows:

(1) direct measurement of the wear state of a brake pad, wherein the actual pad thickness is detected;

(2) permanent measurement of the wear state, the actual pad thickness is output at all times;

(3) the pad wear can be separately detected and output for each pad;

(4) cost savings are possible by way of decreased mechanical structure and lower material use;

(5) optimization of the use of the pad wear volume, because the disc wear is not incorporated in the case of this measurement;

(6) dimensions of the sampling element are freely changeable; and (7) integration of a temperature detection is possible because of the property that the coefficient of resistance of the resistor element is temperature-dependent.

The wear distance sensor has a probe in a housing, which is arranged in a brake pad such that it is subjected to the same wear as the brake pad itself. The wear distance sensor having the probe is therefore also shortened in the same amount by the wear. This advantageously results in a resistance change, which is simple to measure and which is continuously provided as an ohmic resistance value, i.e. a measurement, and therefore display of the pad thickness of each brake pad is possible independently of the wear of the associated brake disc.

A wear distance sensor according to the invention for detecting a wear distance of a brake pad, in particular of a friction brake, having a housing having a friction side and a terminal side; and a probe having two electrical conductor elements in combination with at least one three-dimensional electrical resistor element, wherein two dimensions of the resistor element are not constant in dependence on the wear distance, is characterized in that a third dimension of the resistor element, which is implemented as three-dimensional, is not constant in dependence on the wear distance.

The context that the electrical resistance of a conductor is dependent on its specific resistance, its length, and its cross section is advantageously utilized in this case.

The wear distance sensor has the resistor element as a three-dimensional body, which extends in the direction of the wear distance with a resistor length and perpendicularly thereto with a resistor width. In addition, the resistor element extends perpendicularly to this surface thus formed in a resistor thickness. Therefore, three variables which can be fixed beforehand are provided, using which the resistor element is adaptable to the requirements of a large measurement effect.

For this purpose, the resistor element can have a total resistance which is changed in the event of a decreased resistor length. For example, the total resistance can be decreased. This can be achieved simply in that the resistor thickness of the resistor element decreases in the event of decreased resistor length and the resistor width increases in the event of decreased resistor length. Of course, the total resistance can also increase in the reverse manner.

Alternatively or in combination therewith, the resistor thickness of the resistor element can change continuously or in steps in the event of decreased resistor length, i.e., decrease or increase, wherein the resistor width can decrease or increase continuously or in steps in the event of decreased resistor length.

In one embodiment, it is provided that the resistor element has a triangular shape in projection in the plane which is formed by the resistor length and the resistor width, wherein the base of this triangle extends in the direction of the resistor width and the legs of this triangle are connected in a tip which is arranged on the friction side.

In a preferred design, the first conductor element is applied in an extension in a connection section on the resistor element in the direction of one leg of the triangle in a first terminal section and is electrically conductively connected to the resistor element and extends up to the tip of the triangle, wherein the second conductor element is electrically conductively connected at the edge to the resistor element with a connecting end opposite to the first conductor element in a second terminal section. This connection section ensures that an electron distribution is implemented as substantially homogeneously as possible in the resistor element. This current is tapped using the connecting end of the second conductor element, which functions as the current tap. The second conductor element does not extend up to the tip of the probe. It would form a contact at the tip with the conductor end of the connection section of the first conductor element, which is not desirable, because, for example, a measuring current would thus have to be increased unnecessarily and protective measures would have to be taken. In addition, an auxiliary energy source would thus be overloaded or would have to be oversized.

In a further design, the legs of the triangle can be implemented in the form of a predefinable curve or a plurality of predefinable curves. A characteristic curve of the resistor element which is particularly capable of adaptation is thus to be achieved.

In an alternative embodiment, the resistor element can have a trapezoidal shape in projection in the plane which is formed by the resistor length and the resistor width, wherein the base and the bottom side of this trapezoid extend in the direction of the resistor width and the base of this trapezoid is arranged on the friction side. Also in this case, similarly as in the case of the triangle shape, the first conductor element is applied in an extension in a connection section on the resistor element in the direction of one leg of the trapezoid in a first terminal section and is electrically conductively connected to the resistor element and extends up to the base of the trapezoid, wherein the second conductor element is electrically conductively connected to the resistor element with a connecting end opposite to the first conductor element in a second terminal section on the bottom side of the trapezoid.

Also in this embodiment, the legs of the trapezoid can be implemented in the form of a predefinable curve or a plurality of predefinable curves.

The resistor element can be a metal film or can be used as a resistor layer as a thin-film or thick-film system. A carrier element is provided as the resistor layer, which accommodates and stabilizes the resistor layer.

The construction of the probe of the wear distance sensor can be manufactured easily in industrial mass production, e.g., for producing electronic circuit boards or resistor components (potentiometers, measuring resistors, resistor layers on substrates (ceramics, inter alia)).

The resistor element is formed from a material which has a high specific resistance characteristic value and simultaneously a low coefficient of temperature.

It is provided that the housing completely encloses the resistor element, and is preferably made of an insulating material, e.g., ceramic, high-temperature filler, or plastic, whereby the advantage is provided that the resistor element is enveloped in an electrically-insulated, heat-resistant, and corrosion-resistant manner and can be easily processed.

In a further embodiment, the wear distance sensor has a voltage divider having at least one first divider resistor and at least one second divider resistor. The voltage divider allows a standard signal, e.g., 0 to 5 V, to be generated for the pad wear. Therefore, for example, complex external analysis electronics can be reduced or even omitted entirely. An absolute temperature detection can also be implemented by the use of this voltage divider. In addition, a temperature compensation of the characteristic curve of the sensor may be implemented. The actual pad wear state can therefore be detected independently of the pad temperature.

In a further embodiment, it is provided that the at least one second divider resistor is electrically connected in parallel to the resistor element.

In still a further embodiment, the at least one first divider resistor is electrically connected in series to the at least one second divider resistor and the resistor element and is electrically conductively connected to a third conductor terminal end.

In another embodiment, the at least one first divider resistor can be a temperature-dependent resistor. A separate temperature measurement is therefore possible.

In still a further embodiment, the housing comprises a probe housing section having the friction side and a fastening section, which is connected thereto, having the terminal side and having a fastening profile. It is advantageous if the fastening profile is designed for a press fit, whereby the sensor is secured in a brake pad carrier against axial displacement.

In a further embodiment, the housing has at least one shoulder as a stop surface for defining a fixed position as the reference position.

A brake pad has the above-described wear distance sensor. Of course, it is also possible that a plurality of wear distance sensors can be used in a brake pad.

BRIEF DESCRIPTION OF THE DRAWINGS

FIG. 6b shows an enlarged detail view of circle XI from FIG. 6a; and

FIG. 7 shows a schematic partial sectional view of a brake pad having the further variant of the wear distance sensor from FIG. 6a.

DETAILED DESCRIPTION OF THE DRAWINGS

Figure 1:
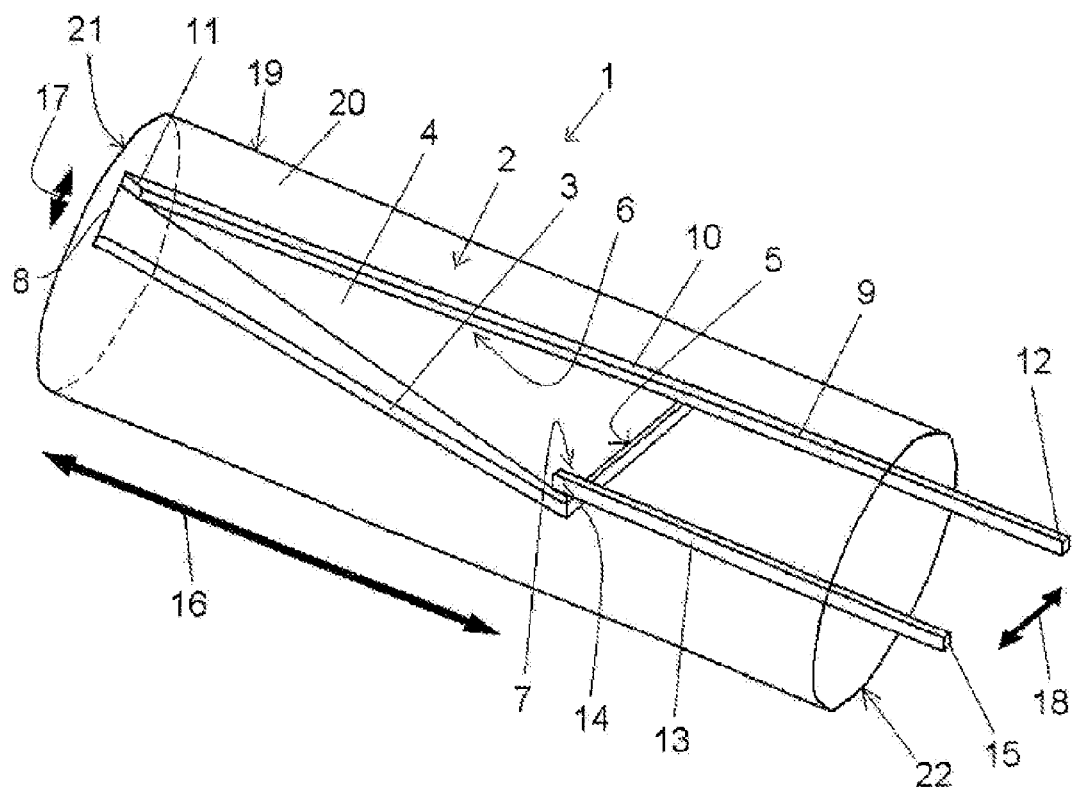
FIG. 1 shows a schematic perspective illustration of an exemplary embodiment of a wear distance sensor according to the invention.

FIG. 1 illustrates an exemplary embodiment of a wear distance sensor 1 according to the invention in a simplified perspective view. In this case, a housing 19 in circular-cylindrical shape is only indicated. Within this housing 19, a probe 2 having a first conductor element 9 and a second conductor element 13 is arranged and is fixedly introduced into the housing 19 by means of a cast material 20 (not shown), for example, an electrically nonconductive filler, wherein a first conductor terminal end 12 and a second conductor terminal end 15 protrude out of the housing 19.

The wear distance sensor 1 has a friction side 21, which faces toward a brake disc 24 of a disc brake 23 (see FIG. 2) when it is installed in a brake pad 26, 26'. A terminal side 22, from which the conductor terminal ends 12 and 15 protrude, is arranged opposite to the friction side 21. The conductor terminal ends 12 and 15 are provided, for example, for connection to a measuring device via a suitable terminal unit (for example, having a plug connection) and respectively extend into the interior of the housing 19 via the first conductor element 9 and the second conductor element 13 in a longitudinal direction of the housing 19 toward the friction side 21 and are electrically conductively connected to the probe 2.

The probe 2 of the wear distance sensor 1 has a three-dimensional resistor element 4 on a carrier element 3, for example, a ceramic substrate. The carrier element 3 is constructed in the shape of an equilateral triangle, whose base side, as the edge 5 of the probe 2, faces toward the terminal side 22 and whose legs run together in a tip at the friction side 21.

The resistor element 4 is applied to the triangular carrier element 4, wherein it is applied here at the tip in a resistor thickness 17 having a front edge 8, which is greater than the resistor thickness 17 at the edge 5. The height of the triangle (from the edge 5 to the tip) corresponds to a resistor length 16, and the length of the edge 5 perpendicular thereto is a resistor width 18 here.

The first conductor element 9 is applied in an extension in a connection section 10 on the resistor element 4 via one leg of the triangle formed by the carrier element 3 and the resistor element 4 applied thereon in a first terminal section 6 and is electrically conductively connected to the resistor element 4. The connection section 10 extends up to the tip of the triangle and ends over the front edge 8 of the resistor element 4 in a conductor end 11. This triangle thus formed can also lie in a projection plane.

The first conductor element 9 has the task of introducing a current over the entire resistor element 4 up to the tip (front edge 8) and thus ensures that an electron distribution is implemented as homogeneously as possible in the resistor element 4. This current is tapped using a connecting end 14 of the second conductor element 13, which functions as a current tap and which is electrically conductively connected to the resistor element 4 opposite to the first conductor element 9 in a second terminal section 7 at the edge 5. The second conductor element 13 does not extend up to the tip of the probe 2. If it did so, it would form a contact at the tip with the conductor end 11 of the connection section 10 of the first conductor element 9, which is not desirable.

The resistor element 4 is preferably formed as a resistor layer from a material which has a high specific resistance characteristic value and simultaneously a low coefficient of temperature. In this manner, in relation to a starting resistance variable in the unworn state at complete resistor length 16 (see also FIG. 3a), a significant resistance change is obtained in the event of an occurring wear distance. Resistor films or thin-film or thick-film systems typically can be used for the resistor element 4 as the resistor layer. In the case of thin-film or thick-film systems, the resistor element 4 is applied to a carrier element 3 made of a material which exerts a stabilizing function.

Figure 2:
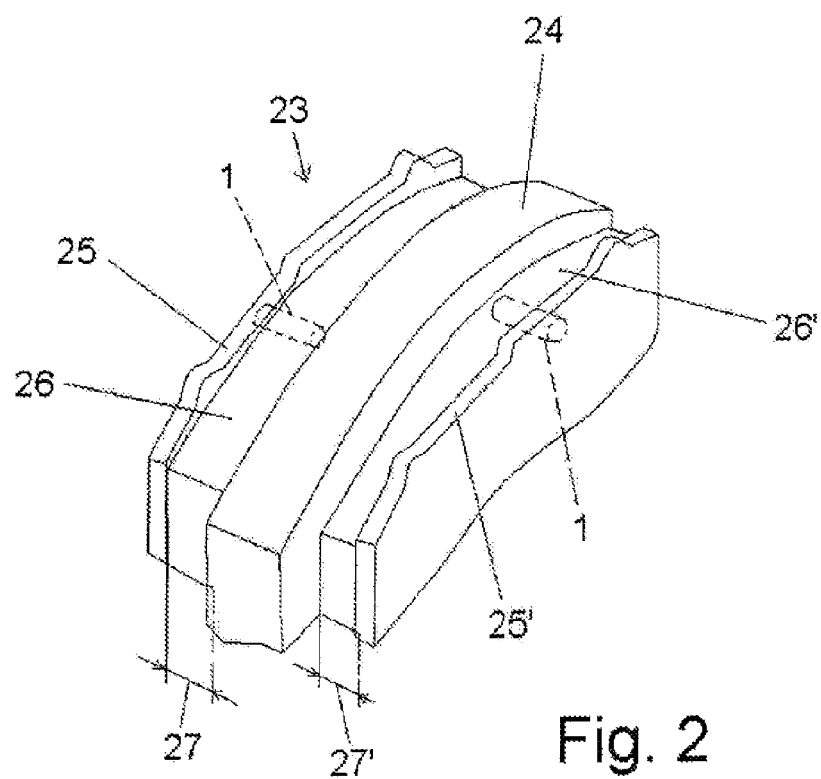
FIG. 2 shows a schematic perspective partial illustration of a disc brake having the wear distance sensors according to the embodiment of FIG. 1.

The wear distance sensor 1 can be used, for example, in a disc brake 23, as shown in FIG. 2 in a schematic, perspective partial illustration.

A brake pad 26, 26' is respectively arranged on an associated pad carrier 25, 25' on both sides of a brake disc 24 (only partially shown), wherein each brake pad 26, 26' has a respective brake pad thickness 27, 27'. A wear distance sensor 1 is introduced inside each brake pad 26, 26'. The surfaces of the brake pads 26, 26' which press against the brake disc 24 are aligned in the new, unworn state with the friction sides 21 of the wear distance sensors 1.

As a result of their function, a wear arises on the brake pads 26, 26', which is detected independently of the wear of the brake disc 24 for both brake pads 26, 26' and can be ascertained in direct measurement. In the case of this disc brake 23, for example, a pneumatically actuated disc brake for commercial vehicles, two brake pads 26, 26' are used, which have a pad thickness 27, 27' of 21 mm in their new state. The permissible remaining pad thickness is 2 mm. A total wear length of 38 mm to be detected results if the wear of the brake disc 24 is not considered.

The cast material 20 has the task of protecting the probe 2 from external influences, electrically insulating it, and allowing its mounting in the brake pad application. A material which has approximately the same strength as the associated brake pad 26, 26' or is significantly softer than the brake disc 24, is electrically insulating, temperature/corrosion resistant, and easy to process is preferably used as the cast material. For example, this can be hard plastic, ceramic, temperature-resistant cast systems, or high-temperature adhesives.

The operating principle of the wear distance sensor 1 is based on a resistance measurement of the resistor element 4. This means that each wear distance sensor 1, in dependence on its wear state, which corresponds to the respective wear of the brake pad thickness 27, 27', has a specific resistance value of its respective resistor element 4, which is measurable at the terminals 12, 15 of the conductor elements 9, 13 and can be assigned in an analysis unit (not shown) via a corresponding calibration to the real wear value. The electrical relationship is analyzed, that is that the electrical resistance of a material is dependent on the specific resistance, the cross section or the width and its thickness, and the length of the conductor through which a current flows.

The associated law is:

$$R = \frac{\rho \cdot b}{A} = \frac{\rho \cdot b}{l \cdot d} \quad (1)$$

In this case, ρ is the specific electrical resistance of the conductor through which a current flows, l is the resistor length 16 of the probe 2, A is the cross-sectional area of the resistor element 4 having the resistor width 18 as the variable b and the resistor thickness 17 as the variable d.

The resistor element 4 is configured to be three-dimensional and has the changeable variables (dimensions) resistor length 16 (*l*), resistor thickness 17 (*d*), and resistor width 18 (*b*). The resistance of the resistor layer 4 of the probe 2 of the wear distance sensor 1 is thus dependent on three wear-state-dependent variables. These three wear-state-dependent variables shape the total resistance value of the resistor layer 4 of the probe 2. The resistor length 16 of the probe 2 corresponds to the brake pad wear, which is less by a specific remaining amount than the respective brake pad thickness 27, 27'. The resistor width 18 is fixed in dependence on an available installation space, and the resistor thickness 17 is implemented in a changeable or stepped manner either in a constant or continuous manner (see below). It is thus possible to influence the characteristic curve of the probe 2 or the wear distance sensor 1.

Figure 3A:
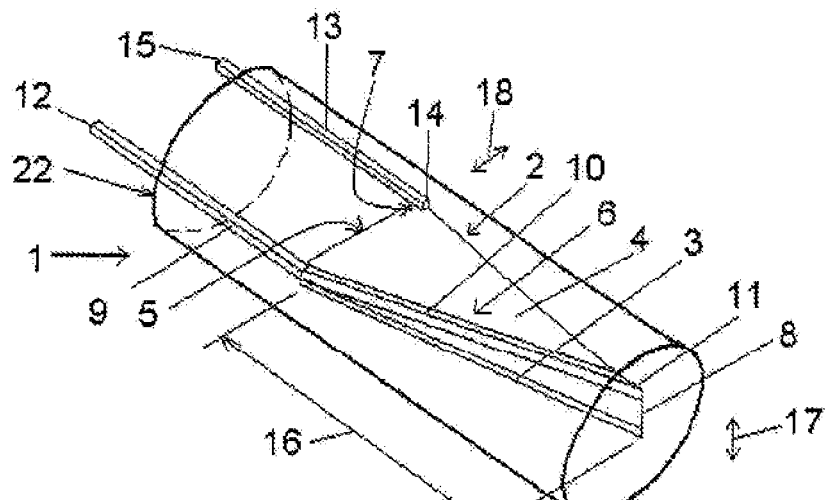
FIGS. 3a-c show schematic illustrations of the wear distance sensor from FIG. 1 in the case of various wear states.
Figure 3B:
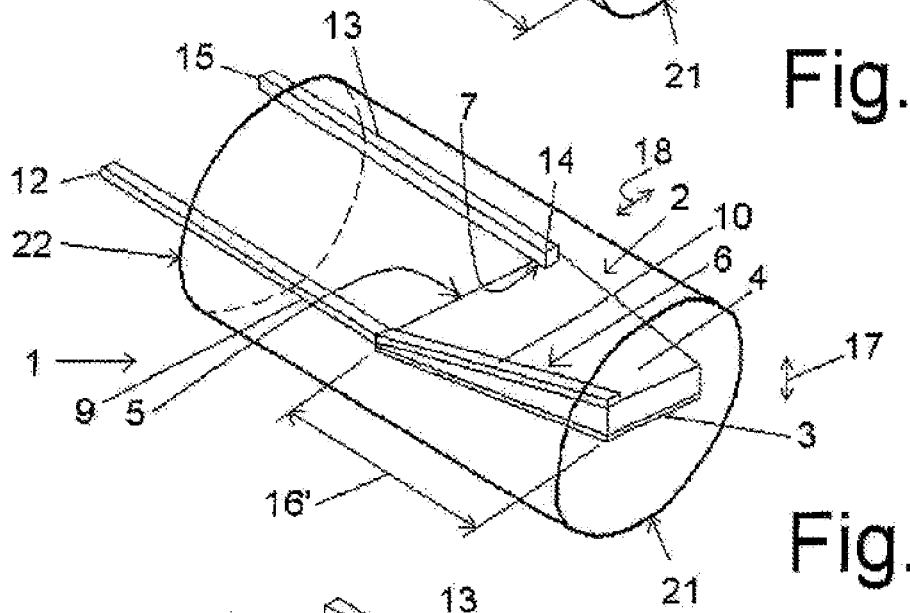
Figure 3C:
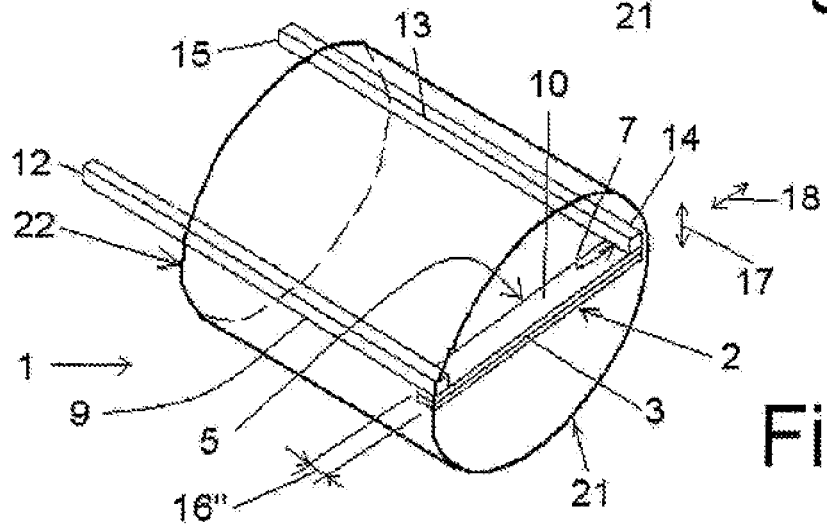

FIGS. 3*a* to 3*c* show schematic illustrations of the wear distance sensor 1 from FIG. 1 in the case of various wear states of an associated brake pad 26, 26'.

In FIG. 3*a*, the wear distance sensor 1 is new and unworn. The resistor length 16 is not shortened. A resistance which is measured at the conductor terminal ends 12 and 15 is relatively small.

A wear state of approximately 50% is shown in FIG. 3*b*. The wear distance sensor 1 is abraded by approximately 50% from the friction side 21 to a resistor length 16'. The cross-sectional area of the resistor element 4 has become smaller in relation to the new state according to FIG. 3*a* and the measured resistance is greater than in the unworn state. In addition, the connection section 10 of the first conductor element 9 is also abraded.

FIG. 3*c* shows a wear state with little remaining pad. The wear distance sensor 1 is abraded by nearly 100% to a remaining resistor length 16", wherein the resistance is significantly higher than in the unworn state because of the cross section of the remaining resistor element 4, which is now extremely small.

A measurement of the resistance of the resistor element 4 of the probe 2 of the wear distance sensor 1 may be carried out according to Ohm's law R=V/I. For this purpose, the resistor element 4 can be connected in series to a further resistor, wherein a voltage divider is implemented.

A current divider may be constructed in combination with a resistor connected in parallel to the resistor element 4.

As the only resistor, the current flowing through it must be kept constant for a changeable voltage in dependence on the wear, and the voltage must remain constant for a changeable current.

Figure 4A:
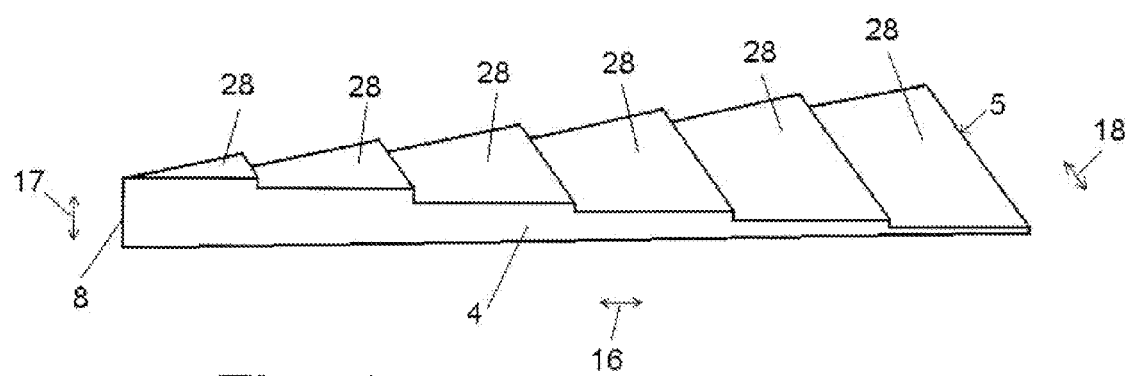
FIGS. 4a-d show geometric variants of a resistor of the wear distance sensor from FIG. 1.
Figure 4B:
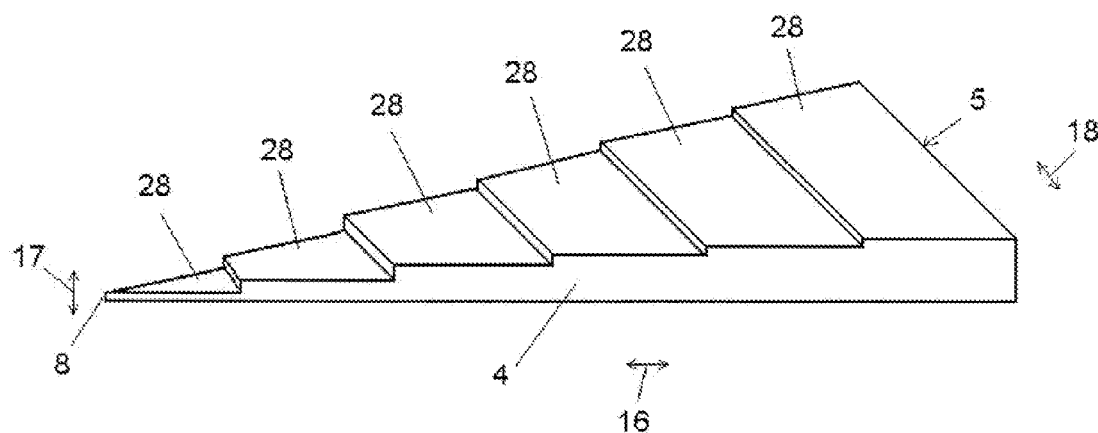

For optimum adaptation of the resistance of the resistor element 4, it can be implemented with steps 28 over the resistor length 16, as shown in FIG. 4*a* in a variant. The number of the steps 28 can be arbitrary. Six steps 28 having different thicknesses in the direction of the resistor thickness 17 are shown here, wherein the height of the steps 28 decreases from the front edge 8 toward the edge 5 of the resistor element 4. The height of the steps can also increase from the front edge 8—as shown in FIG. 4*b*.

Figure 4C:
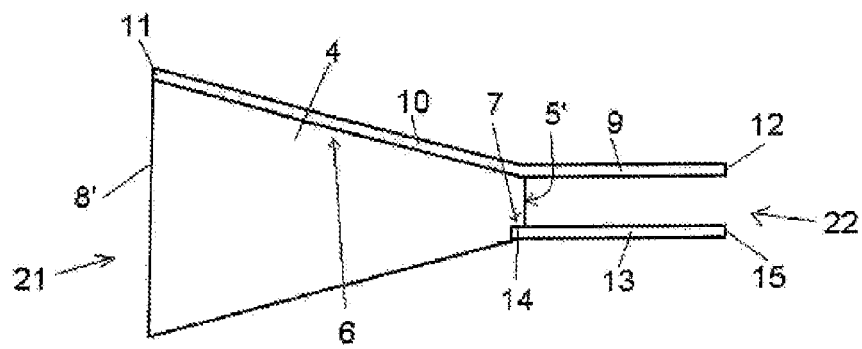

Depending on the desired characteristic curve of the probe 2, it can be arranged, as shown in FIG. 4*c* in a further variant, such that the front edge 8 presses in widened form against the wearing friction side 21 in the direction of the resistor width 18. The conductor elements 9 and 13 are attached on the edge 5, which is now shortened in the direction of the resistor width 18, as already described above in conjunction with FIG. 1. A trapezoid shape of the resistor element 4 results therefrom in the projection plane. The widened front edge 8 forms a base 8' of the trapezoid and the edge 5 forms the bottom side 5', which is parallel to the base 8', of the trapezoid. The connection section 10 lies on one leg of this trapezoid and extends from the edge 5 up to the front edge 8.

Figure 4D:
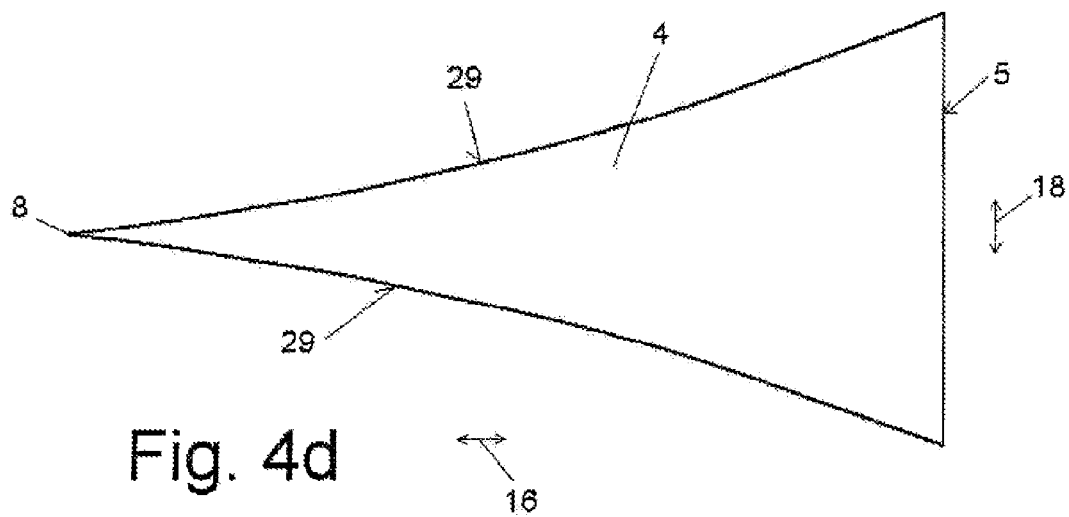

FIG. 4*d* shows a further variant, wherein the legs of the triangle of the resistor element 4 follow a predefinable profile of a curve 29.

The wear distance sensor 1 can be used not only for detecting a wear distance of brake pads for disc brakes 23, in particular pneumatically actuated disc brakes 23 in the commercial vehicle field, but rather also in all other applications, in the case of which wear or a distance change occurs in the form of material abrasion.

Furthermore, it is contemplated to embody the wear distance sensor 1 as a temperature sensor, in order to allow corresponding temperature-dependent resistance corrections. Such an integration of a temperature detection is possible because of the property that the coefficient of resistance of the resistor element 4 is temperature-dependent.

Figure 5A:
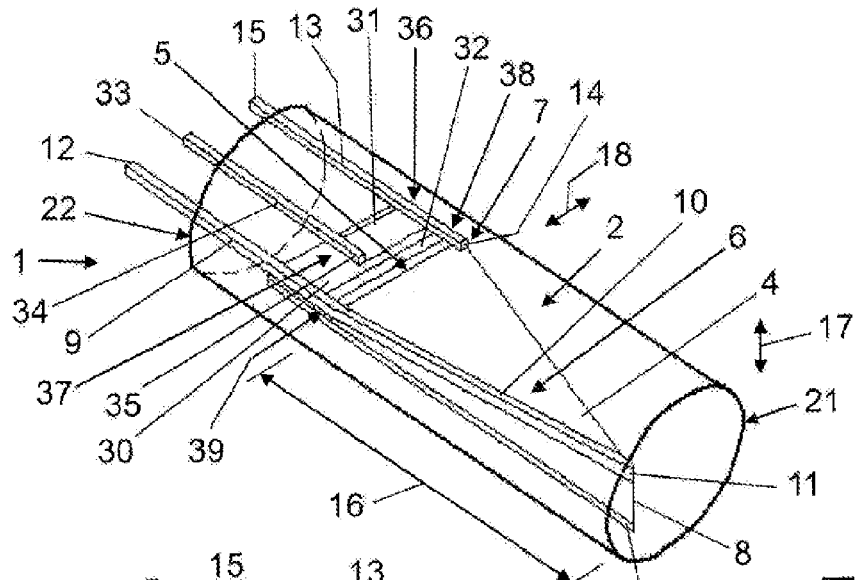
FIGS. 5a-c show schematic illustrations of a variant of the wear distance sensor in the case of various wear states.
Figure 5B:
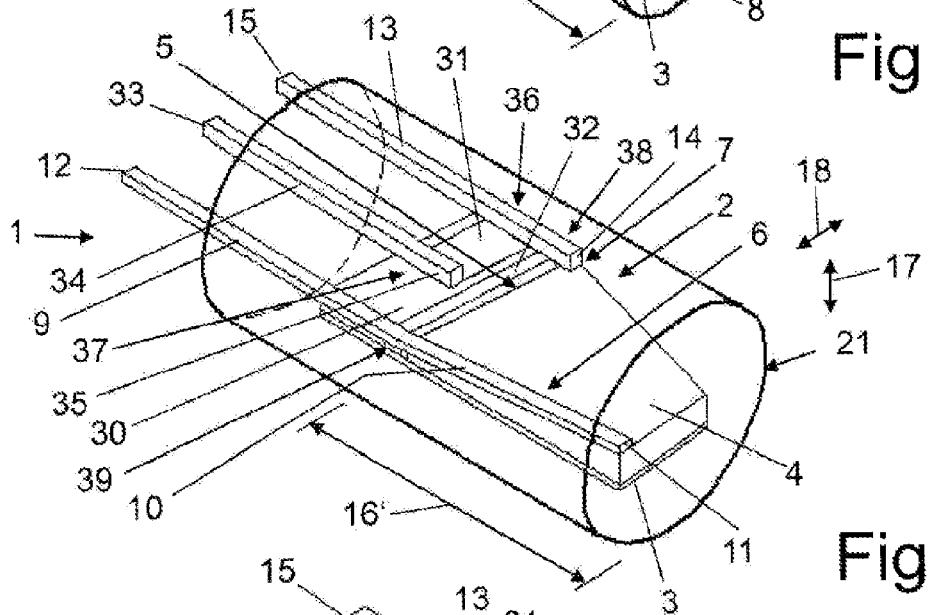
Figure 5C:
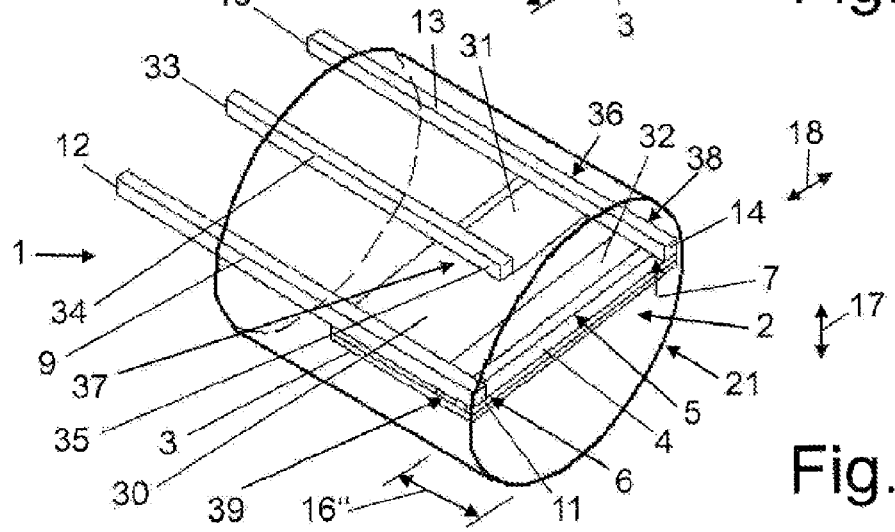

For this purpose, FIGS. 5*a*-*c* show schematic illustrations of a variant of the wear distance sensor 1 in the case of various wear states similar to FIGS. 3*a*-*c*.

The part of the probe 2 facing toward the friction side 21 is constructed similarly as already explained above in conjunction with FIGS. 3*a*-*c*. Therefore, firstly only the differences from FIGS. 3*a*-*c* will be described here and then they will be explained in greater detail.

One difference is that the carrier element 3, on the edge 5 of the triangle which faces toward the terminal side 22, has a rectangular attachment here, which is designated as the auxiliary function section 30 and extends toward the terminal side 22.

The auxiliary function section 30 is used here to accommodate a first and a second divider resistor 31, 32 and to fasten an associated third conductor element 34 having a third conductor terminal end 33. The divider resistors 31, 32 are used to implement the above-described voltage or current divider, respectively, and will be explained in greater detail hereafter.

A further difference is that the triangular shape of the probe 2 forms a right triangle, wherein the right angle of this triangle is enclosed by the edge 5 and the side having the first conductor element 9. The first conductor element 9 and the connection section 10 therefore extend in a shared plane, which is spanned by the resistor length 16 and the resistor thickness 17. In addition, the front edge 8 of the probe 2 is arranged off-center on the friction side 21.

The first conductor element 9 extends with its connection section 10 up to the front edge 8 of the probe 2, as is also shown in FIGS. 3*a*-*c*. The conductor end 11 of the first conductor element is arranged over the front edge 8. If the first conductor terminal end 12, which is directly electrically connected to the conductor end 11, is electrically conductively connected to ground of an associated vehicle, for example, the resistance value of the probe 2, which is dependent on the associated brake pad thickness 27, 27', is not changed both when the brake is not actuated and when the brake is actuated, if the conductor end 11 comes into contact with the brake disc (or brake drum, depending on the brake embodiment), which is also electrically conductively connected to ground. In other words, the brake pad thickness 27, 27' can always be detected without exception.

In another embodiment (not shown), for example, depending on the customer desire, for example, the conductor end 11 can be set to a specific electrical potential via the first conductor terminal 12, for example, via a further resistor. If, when the brake is actuated, the conductor end 11 comes into contact with the brake disc/brake drum, a voltage drops at the further resistor, which can be used as the signal for the point-in-time at which the brake pad contacts the brake disc/brake drum. This signal can be used, for example, for a control circuit or for error monitoring (e.g., incorrect actuation by brake valves, undesired clearance reduction, etc.). The further resistor for this purpose could be attached on the function section 30, for example.

Of course, a further conductor end (not shown) having an additional terminal section, which is held by the function section 30, can also be used for this purpose.

The function section 30 comprises in this variant a widening of the carrier element 3. The resistor element 4 ends at the edge 5. The second divider resistor 32 is arranged parallel to the edge 5. The first divider resistor 31 is arranged further in the direction toward the terminal side 22. The divider resistors 31, 32 can respectively be implemented, for example, by way of additional resistor layers, which are applied to the carrier element 3 on the auxiliary function section 30. Discrete resistor components are also possible, of course.

The first divider resistor 31 is electrically conductively connected on one side in a first divider terminal section 36 to the second conductor element 13 and extends in the direction of the resistor width 18 approximately up to the middle of the auxiliary function section 30. The other side, which is opposite to the first divider terminal section 36, is electrically conductively connected there in a second divider terminal section 37 in the region of a third conductor end 35 of the third conductor element 34. The third conductor terminal end 33 is led out of the sensor 1 on the terminal side 22 between the other conductor terminal ends 12 and 15.

The second divider resistor 32 is embodied as shorter in the direction of the resistor length 16 than the first divider resistor 31 and is electrically conductively connected on one side in a third divider terminal section 38, like the first divider resistor 31, to the second conductor element 13. The second divider resistor 32 extends in the direction of the resistor width 18 over the width of the auxiliary function section 30 parallel to the edge 5 up to the first conductor element 9, to which it is electrically conductively connected in a fourth divider terminal section 39.

Figure 5D:
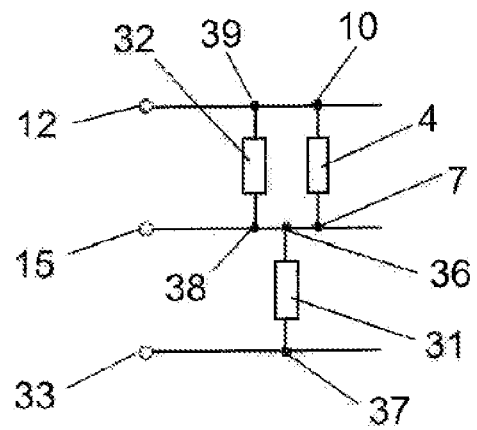
FIG. 5d shows an electrical circuit diagram of a voltage divider.

FIG. 5d shows an electrical circuit diagram of a voltage divider, which is formed with the variant according to FIGS. 5a-c. The reference signs in the circuit diagram correspond to those in FIGS. 5a-c.

The second divider resistor 32 is electrically connected in parallel to the resistor element 4 via the third and fourth divider terminal sections 38, 39, while in contrast the first divider resistor 31 is electrically conductively connected using one terminal via the first divider terminal section 36 to both one terminal of the second divider resistor 32 and also to one terminal of the resistor element 4. Viewed from the third conductor terminal end 33, the first divider resistor 31 is electrically connected in series to the resistor element 4 and the second divider resistor 32. A voltage divider is thus implemented, which lies between the first and second conductor terminal ends 12 and 15. A partial voltage of this voltage divider can be tapped at the second conductor terminal end 15.

In another variant, the first divider resistor 31 can be embodied from a material having a specific temperature behavior, for example, a temperature-dependent resistor, and can be used as a temperature sensor. A resistance value of the first divider resistor 31, which is dependent on the temperature, could be detected in this case between the third conductor terminal end 33 and the second conductor terminal end 15. Of course, a discrete sensor element can also be used as a temperature sensor, wherein a further conductor terminal end (not shown) would also be possible, for example.

Using this voltage divider integrated in the sensor 1, it is possible to generate a standard signal, for example, 0 to 5 V, for the pad wear. Therefore, complex external analysis electronics can be reduced or even omitted entirely, for example. If these analysis electronics are omitted, an analog pad wear state detection is contemplated, which is carried out at defined maintenance intervals, for example. The sensor 1 is only powered using a voltage source during the measurement in this case; removing tires of the associated brakes is therefore superfluous.

An absolute temperature detection can also be implemented by the use of this voltage divider, i.e., the actual temperature of the brake pad 26, 26' is detected.

In addition, a temperature compensation of the characteristic curve of the sensor 1 may be implemented. The actual pad wear state can therefore be detected independently of the pad temperature.

Without this voltage divider, only a relative temperature detection in relation to a defined reference point, for example, if the engine is started after a relatively long shutdown time (ambient temperature), is possible. The actual pad wear state is also detected at this defined reference point (ambient temperature).

Figure 6A:
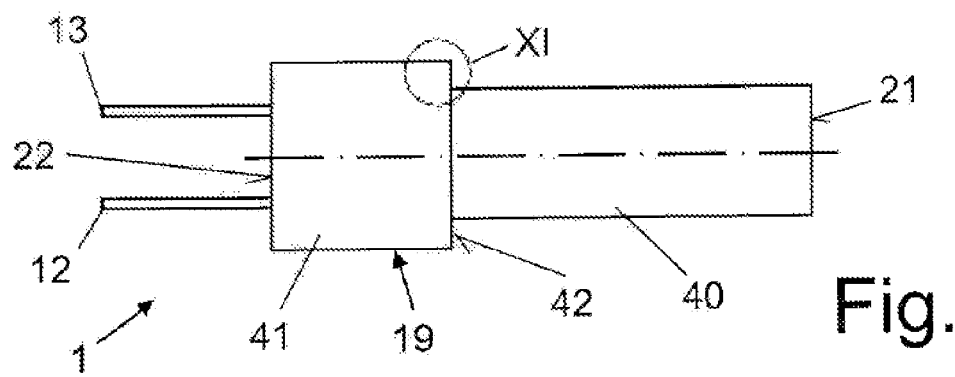
FIG. 6a shows a schematic side view of a further variant of the wear distance sensor.
Figure 6B:
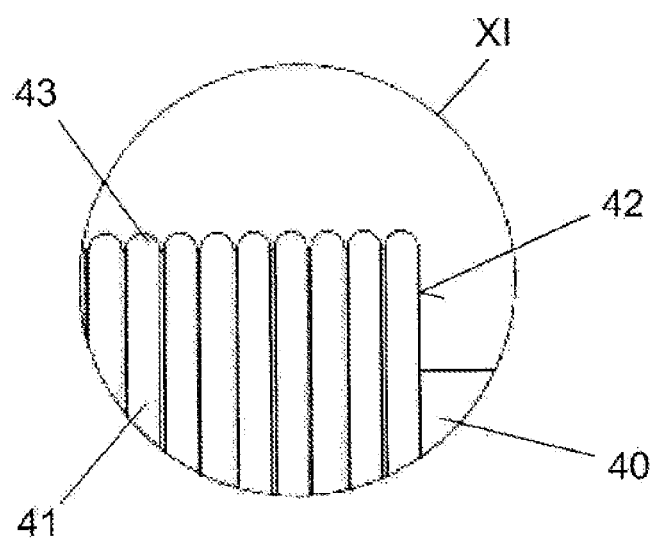
Figure 7:
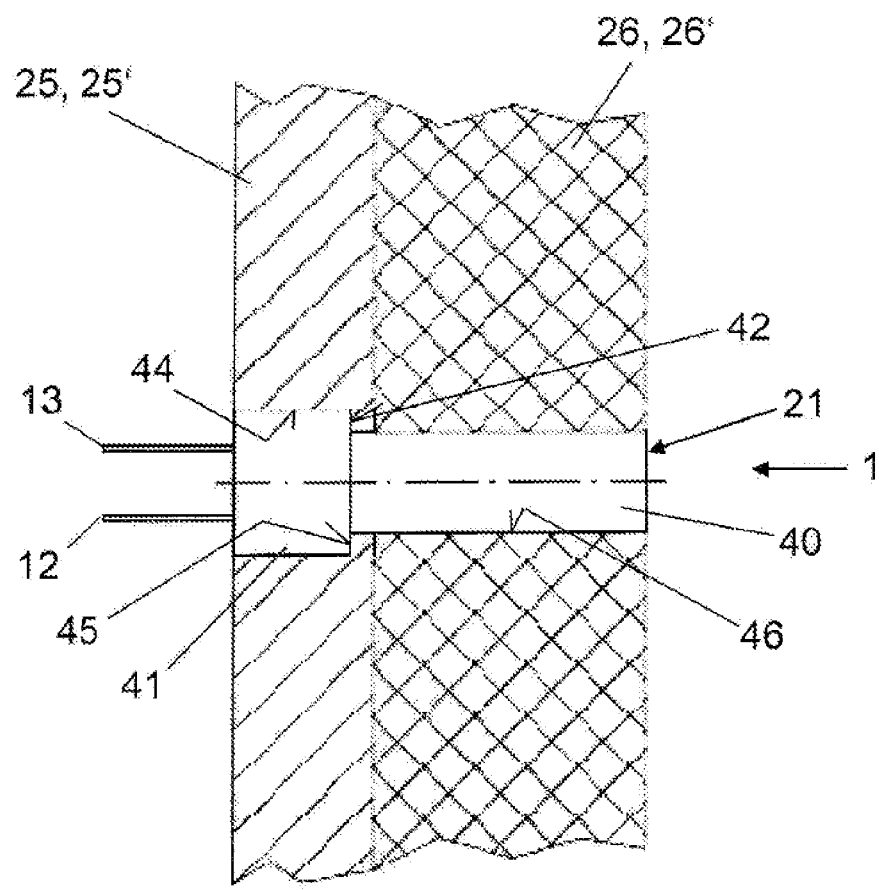

FIG. 6a illustrates a schematic side view of a further variant of the wear distance sensor 1. FIG. 6b shows an enlarged detail view of circle XI from FIG. 6a. FIG. 7 is a schematic partial sectional view of a brake pad 26, 26' having the further variant of the wear distance sensor 1 according to FIG. 6a.

The housing 19 is implemented as a jacket made of electrically insulating material, for example, a temperature-resistant cast compound, in a defined shape. The housing 19 has a probe housing section 40 having the friction side 21 and a fastening section 41, which is connected thereto, having the terminal side 22 for the conductor terminal ends 12, 13 (and possibly others).

The probe housing section 40 and the fastening section 41 are implemented here having a circular-cylindrical cross section. Of course, other cross sections are possible. An external diameter of the fastening section 41 is larger than an external diameter of the probe housing section 40. A shoulder 42 is thus formed at the connecting point between the probe housing section 40 and the fastening section 41 as a stop surface for the installation of the sensor 1 in a brake pad 26, 26', as described below.

The fastening section 41 has a fastening profile 43, as can be seen in the enlarged view according to FIG. 6b. The fastening profile 43 has peripheral rounded ribs, which are arranged adjacent to one another in the axial direction. The fastening profile 43 provides a clamping profile for the friction-locked fastening of the sensor 1 using the fastening section 41 in the pad carrier 25, 25', as FIG. 7 shows.

The pad carrier 25, 25' is provided with a fastening receptacle 44, which corresponds to the fastening section 41 of the sensor 1. The fastening receptacle 44 is a borehole having a stepped contour having a stop surface 45. The stop surface 45 is provided with a borehole, which is somewhat larger in diameter than the external diameter of the probe housing section 40 of the sensor 1. The brake pad 26, 26' has a borehole, which is coaxial to the fastening receptacle 44 and the stop surface 45, for the probe housing section 40 of the sensor 1. The sensor 1 is inserted into the pad carrier 25, 25' in such a manner that the shoulder 42 of the fastening section 41 presses against the stop surface 45 of the fastening receptacle 44. The sensor 1 is thus fixed in a defined position in the pad carrier 25, 25' with respect to the brake pad 26, 26'. This defined fixing to form a reference position is necessary to unambiguously assign the characteristic curve of the sensor 1 to the wear amount of the brake pad 26, 26'.

The fastening profile 43 forms a radial clamp through a press fit for the friction-locked fixing of the fastening section 41 of the sensor in the fastening receptacle 44 of the pad carrier 25, 25'. Because of the press fit, the sensor cannot be axially displaced in case of actuation of the brake pad 26, 26', which could result in corruption of the characteristic curve. In addition, the sensor 1 can be fixed in a friction-locked manner in the fastening receptacle 44 in the pad carrier 25, 25' by means of a high-temperature adhesive and/or form-fitting caulking in the pad carrier 25, 25'.

The embodiment of the probe 2 of the sensor 1 having two non-constant dimensions (resistor length 16, resistor width 18) but constant thickness (resistor thickness 17) causes a nonlinear characteristic curve (resistance, voltage, current change over the wear amount), which must be linearized by additional electronics (analysis unit). The use of the third non-constant dimension (resistor thickness 17) has a decisive effect on the characteristic curve of the sensor 1, so that a linearization is achieved and additional linearization electronics are not necessary. Customer-specific characteristic curves may thus be generated, which can be used as an independent feature or as a safeguard against incorrect installation and/or product pirating.

The invention is not restricted to the above-described exemplary embodiments. It is modifiable in the scope of the appended claims. Thus, for example, the resistor thickness 17 of the resistor element 4 can continuously decrease over the resistor length 16 or can be combined with steps 28. The steps 28 can decrease, increase, or remain constant in their thickness (in the direction of the resistor thickness 17).

It is contemplated that the stop surface 42 of the housing 19 of the sensor 1 is formed onto the probe housing section 41, wherein the sensor 1 is insertable from the brake pad side into the pad carrier 25, 25'.

LIST OF REFERENCE NUMERALS 1 sensor
2 probe
3 carrier element
4 resistor element
5 edge
5' bottom side
6 first terminal section
7 second terminal section
8 front edge
8' base
9 first conductor element
10 connection section
11 conductor end
12 first conductor terminal end
13 second conductor element
14 connecting end
15 second conductor terminal end
16, 16', 16" resistor length
17 resistor thickness
18 resistor width
19 housing
20 cast material
21 friction side
22 terminal side
23 disc brake
24 brake disc
25, 25' pad carrier
26, 26' brake pad
27, 27' brake pad thickness
28 step
29 curve
30 auxiliary function section
31, 32 divider resistor
33 third conductor terminal end
34 third conductor element
35 third conductor end
36 first divider terminal section
37 second divider terminal section
38 third divider terminal section
39 fourth divider terminal section
40 probe housing section
41 fastening section
42 shoulder
43 fastening profile
44 fastening receptacle
45 stop surface
46 receptacle

The invention claimed is:

1. A wear distance sensor for detecting a wear distance of a brake pad, comprising:
   a housing having a friction side and a terminal side;
   a probe having two electrical conductor elements and at least one electrical resistor element, wherein:
   two dimensions of the resistor element are not constant in dependence on the wear distance,
   a third dimension of the resistor element is not constant in dependence on the wear distance,
   the resistor element extends as a three-dimensional body in a direction of the wear distance with a resistor length and, perpendicularly thereto, with a resistor width, the resistor element having a resistor thickness extending perpendicularly to a surface formed by the resistor length and width,
   the resistor element has a triangular shape in a projection in a plane formed by the resistor length and the resistor width, a base of the triangular shape extending in a direction of the resistor width and legs of the triangular shape connecting in a tip arranged on the friction side of the housing,
   a first conductor element of the two electrical conductor elements is applied in an extension in a connection section on the resistor element in a direction of one leg of the triangular shape in a first terminal section and is electrically conductively connected to the resistor element and extends up to the tip of the triangular shape,
   a second conductor element of the two electrical conductor elements is electrically conductively connected at an edge of the resistor element with a connecting end opposite to the first conductor element in a second terminal section.

2. The wear distance sensor as claimed in claim 1, wherein the legs of the triangle are configured as a predefinable curve or a plurality of predefinable curves.

3. The wear distance sensor as claimed in claim 1, wherein the resistor element has a total resistance which is changed in an event of a decreased resistor length.

4. The wear distance sensor as claimed in claim 3, wherein the resistor thickness of the resistor element changes in an event of decreased resistor length and the resistor width also changes in an event of decreased resistor length.

5. The wear distance sensor as claimed in claim 4, wherein the resistor thickness of the resistor element changes continuously or in steps in an event of decreased resistor length and the resistor width changes continuously or in steps in an event of decreased resistor length.

6. The wear distance sensor as claimed in claim 1, wherein the resistor element is a metal film.

7. The wear distance sensor as claimed in claim 1, wherein the resistor element is implemented as a resistor layer as a thin-film or thick-film system and is applied to a carrier element.

8. The wear distance sensor as claimed in claim 1, wherein the resistor element is formed from a material which has a high specific resistance characteristic value and simultaneously a low coefficient of temperature.

9. The wear distance sensor as claimed in claim 1, wherein the wear distance sensor has a voltage divider having at least one first divider resistor and at least one second divider resistor.

10. The wear distance sensor as claimed in claim 9, wherein the at least one second divider resistor is electrically connected in parallel to the resistor element.

11. The wear distance sensor as claimed in claim 9, wherein the at least one first divider resistor is electrically connected in series to the at least one second divider resistor and the resistor element and is electrically conductively connected to a third conductor terminal end.

12. The wear distance sensor as claimed in claim 9, wherein the at least one first divider resistor is a temperature-dependent resistor.

13. The wear distance sensor as claimed in claim 12, wherein the housing comprises a probe housing section having the friction side and a fastening section, which is connected thereto, having the terminal side and having a fastening profile.

14. The wear distance sensor as claimed in claim 13, wherein the fastening profile is designed for a press fit.

15. The wear distance sensor as claimed in claim 13, wherein the housing has at least one shoulder as a stop surface.

16. A wear distance sensor for detecting a wear distance of a brake pad, comprising:
    a housing having a friction side and a terminal side; and
    a probe having two electrical conductor elements in combination with at least one electrical resistor element, wherein:
        two dimensions of the resistor element are not constant in dependence on the wear distance,
        a third dimension of the resistor element is not constant in dependence on the wear distance,
        the resistor element extends as a three-dimensional body in a direction of the wear distance with a resistor length and, perpendicularly thereto, with a resistor width, and the resistor element extends perpendicularly to a surface thus formed in a resistor thickness,
        the resistor element has a trapezoidal shape in a projection in the plane which is formed by the resistor length and the resistor width, wherein a base and a bottom side of the trapezoid extend in the direction of the resistor width and the base of this trapezoid is arranged on the friction side, and
    a first conductor element is applied in an extension in a connection section on the resistor element in the direction of one leg of the trapezoid in a first terminal section and is electrically conductively connected to the resistor element and extends up to the base of the trapezoid, wherein a second conductor element is electrically conductively connected to the resistor element with a connecting end opposite to the first conductor element in a second terminal section on the bottom side of the trapezoid.

17. The wear distance sensor as claimed in claim 16, wherein the legs of the trapezoid are configured as a predefinable curve or a plurality of predefinable curves.

18. The wear distance sensor as claimed in claim 16, wherein the resistor element has a total resistance which is changed in an event of a decreased resistor length.

19. The wear distance sensor as claimed in claim 18, wherein the resistor thickness of the resistor element changes in an event of decreased resistor length and the resistor width also changes in an event of decreased resistor length.

20. The wear distance sensor as claimed in claim 19, wherein the resistor thickness of the resistor element changes continuously or in steps in an event of decreased resistor length and the resistor width changes continuously or in steps in an event of decreased resistor length.

21. A brake pad, comprising:
    a backing plate;
    friction material secured to the backing plate;
    a wear distance sensor for detecting wear distance of the friction material, the wear distance sensor comprising:
        a housing having a friction side and a terminal side;
    a probe having two electrical conductor elements and at least one electrical resistor element, wherein:
        two dimensions of the resistor element are not constant in dependence on the wear distance,
        a third dimension of the resistor element is not constant in dependence on the wear distance,
        the resistor element extends as a three-dimensional body in a direction of the wear distance with a resistor length and, perpendicularly thereto, with a resistor width, the resistor element having a resistor thickness extending perpendicularly to a surface formed by the resistor length and width,
        the resistor element has a triangular shape in a projection in a plane formed by the resistor length and the resistor width, a base of the triangular shape extending in a direction of the resistor width and legs of the triangular shape connecting in a tip arranged on the friction side of the housing,
    a first conductor element of the two electrical conductor elements is applied in an extension in a connection section on the resistor element in a direction of one leg of the triangular shape in a first terminal section and is electrically conductively connected to the resistor element and extends up to the tip of the triangular shape,
    a second conductor element of the two electrical conductor elements is electrically conductively connected at an edge of the resistor element with a connecting end opposite to the first conductor element in a second terminal section.

22. A brake pad, comprising:
a backing plate;
friction material secured to the backing plate;
a wear distance sensor for detecting wear distance of the friction material, the wear distance sensor comprising:
  a housing having a friction side and a terminal side; and
  a probe having two electrical conductor elements in combination with at least one electrical resistor element, wherein:
two dimensions of the resistor element are not constant in dependence on the wear distance,
a third dimension of the resistor element is not constant in dependence on the wear distance,
the resistor element extends as a three-dimensional body in a direction of the wear distance with a resistor length and, perpendicularly thereto, with a resistor width, and the resistor element extends perpendicularly to a surface thus formed in a resistor thickness,
the resistor element has a trapezoidal shape in a projection in the plane which is formed by the resistor length and the resistor width, wherein a base and a bottom side of the trapezoid extend in the direction of the resistor width and the base of this trapezoid is arranged on the friction side, and
a first conductor element is applied in an extension in a connection section on the resistor element in the direction of one leg of the trapezoid in a first terminal section and is electrically conductively connected to the resistor element and extends up to the base of the trapezoid, wherein a second conductor element is electrically conductively connected to the resistor element with a connecting end opposite to the first conductor element in a second terminal section on the bottom side of the trapezoid.

* * * * *